June 12, 1945.  H. P. PHILLIPS  2,377,960
MACHINE FOR THE MANUFACTURE OF PISTON RINGS
Filed June 3, 1944

INVENTOR.
HAROLD P. PHILLIPS
BY
Earl D. Chappell
ATTORNEYS.

Patented June 12, 1945

2,377,960

UNITED STATES PATENT OFFICE 2,377,960

MACHINE FOR THE MANUFACTURE OF PISTON RINGS

Harold P. Phillips, Hastings, Mich., assignor to Hastings Manufacturing Company, Hastings, Mich., a corporation of Michigan Application June 3, 1944, Serial No. 538,630

13 Claims. (Cl. 29—27)

This invention relates to improvements in machines for the manufacture of piston rings.

The main objects of this invention are:

First, to provide a machine for the manufacture of piston ring elements of the split expansible type which enables the very rapid and uniform production of the piston ring elements.

Second, to provide a machine for the manufacture of piston ring and like elements which requires little attention on the part of the operator, the work being automatically advanced to the tool or tools and automatically sized and positioned for the machining operation.

Third, to provide a machine of this character in which the work can be machined externally and internally at the same time.

Fourth, to provide a machine of this character in which elements such as split expansible piston ring elements are automatically sized and positioned relative to the tool and effectively held during the tooling or machining operation.

Objects relating to details and economies of the invention will appear from the description to follow. The invention is defined and pointed out in the claims.

Preferred embodiments of the invention are illustrated in the accompanying drawing, in which.

In the machine illustrated in the accompanying drawing, 1 represents a bed or table upon which the operating parts are mounted. This may be of any suitable character and is shown conventionally. On this bed or table is a pedestal 2 supporting the work chuck 3 which has a longitudinal bore 4 of considerable length adapted to receive a plurality of work elements 5 in side by side relation.

Figure 4:
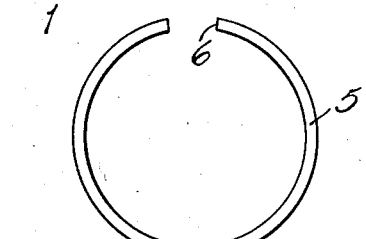
Fig. 4 is a side view of a split piston ring element illustrating the kind of work for which the machine is well adapted.

The work elements 5 illustrated are resilient expansible piston ring elements having splits or gaps 6. The element 5 is shown in normal expanded position in Fig. 4.

The chuck is provided with a rearwardly tapered rear portion 7 adapted to gradually contract and size the piston ring elements for the machining operation as they are advanced through and discharged from the chuck.

The chuck is provided with an internal spline or aligning member 8 which engages the splits of the piston ring elements, as illustrated. The work is advanced through the chuck by means of a hydraulic ram 9, the head 10 of which has a slot 11 aligned with the aligning member 8. Suitable controls, not illustrated, are provided for the flow of fluid to and from the cylinder 12.

Figure 1:
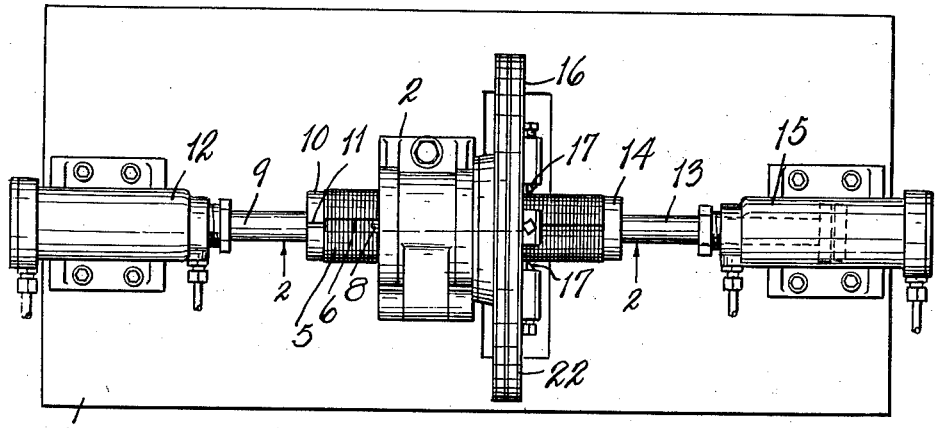
Fig. 1 is a fragmentary plan view of a structure embodying the features of my invention, parts being conventionally shown for convenience in illustration.
Figure 2:
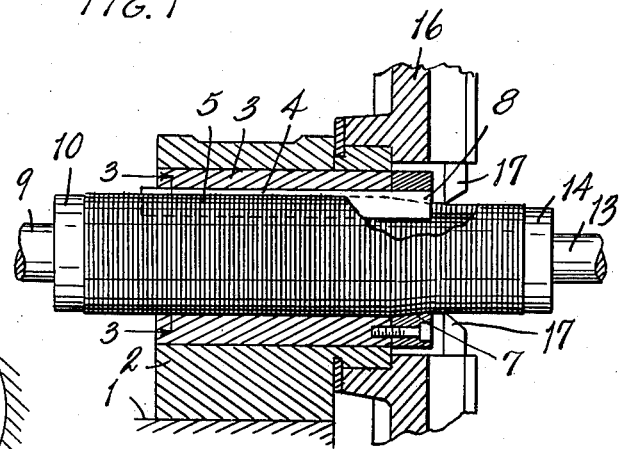
Fig. 2 is an enlarged fragmentary view partially in longitudinal section on a line corresponding to line 2—2 of Fig. 1.
Figure 3:
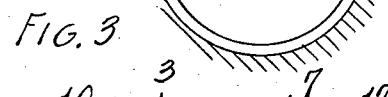
Fig. 3 is an enlarged fragmentary view in section on line 3—3 of Fig. 2.

A second ram 13 having a head 14 is provided to oppose the thrust of the feeding ram, yielding however to the thrust thereof so that the work elements are clamped between the two rams and are held in aligned controlled position, as illustrated in Figs. 1 and 2.

A cylinder 15 is also provided with suitable control means, not illustrated. It will be understood that the feeding pressure and the retarding pressure is such that the work is clamped between them and held in proper position for the machining operation.

In the embodiment illustrated, the rotary cutter head 16 is rotatably mounted on the rear end of the chuck and is provided with a plurality of cutters 17, four being a desirable number, as this expedites the machining and also the thrust of the cutters on the work is substantially balanced.

Figure 5:
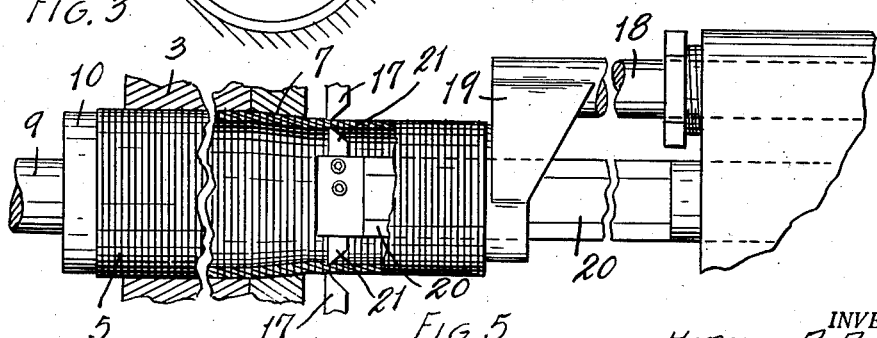
Fig. 5 is an enlarged fragmentary view partially in longitudinal section illustrating an embodiment of my invention in which the work is machined externally and also internally.

In the embodiment shown in Fig. 5, the ram 18 is disposed at one side of the axis of the work and is provided with a head 19 projecting laterally to engage the work and having a hole therethrough receiving the tool bar or spindle 20. This tool bar or spindle is provided with internal cutters 21 acting on the ring elements as they are advanced and fed by the feed ram and while they are supported between the rams. Preferably, the internal and external tools are arranged to act upon the same ring elements so that the thrust is further compensated.

I have not illustrated the driving means for the external tool other than the pulley 22 and I have not illustrated the driving means for the tool bar or spindle 20.

With the parts thus arranged, a plurality of the ring elements may be advanced through the machine at one loading thereof. The ring elements are automatically sized and supported both for internal and external machining where that is desired. It will be readily understood that grinding or polishing tools might be substituted for the cutters.

Machines embodying my invention not only enable rapid production or large output but its use results in work of great uniformity. I have not attempted to illustrate or describe certain modifications or adaptations of my invention as it is believed that this disclosure will enable those skilled in the art to embody or adapt my invention as may be desired.

Having thus described my invention, what I claim as new and desire to secure by Letters Patent is:

1. A machine for machining split expansible resilient piston ring elements comprising an elongated chuck adapted to receive a plurality of split resilient expansible piston ring elements in side by side relation, said chuck having a rearwardly tapered portion at the rear end thereof whereby the ring elements are contracted as they are successively advanced therein and discharged from the rear end thereof, work aligning means disposed longitudinally within said chuck and adapted to engage the splits of the ring elements advanced therein, pressure feed means for advancing a plurality of piston ring elements within said chuck in side by side relation, means for applying an opposed pressure to a plurality of ring elements so advanced and projected from the chuck whereby they are supported in contracted aligned relation at the rear of the chuck, a cutter head rotatably mounted on said chuck and provided with a plurality of external cutters acting externally on the ring elements successively while they are so supported and advanced, and a cutter bar extending into the plurality of ring elements so supported and advanced from the rear end thereof and provided with a plurality of cutters acting internally upon the ring elements successively as they are advanced and while so supported, said internal cutters being positioned to act upon the ring elements while they are being acted upon by said external cutters.

2. A machine for machining split expansible resilient piston ring elements comprising an elongated chuck adapted to receive a plurality of split resilient expansible piston ring elements in side by side relation, said chuck having a rearwardly tapered portion at the rear end thereof whereby the ring elements are contracted as they are successively advanced therein and discharged from the rear end thereof, work aligning means disposed longitudinally within said chuck and adapted to engage the splits of the ring elements advanced therein, pressure feed means for advancing a plurality of piston ring elements within said chuck in side by side relation, means for applying an opposed pressure to a plurality of ring elements so advanced and projected from the chuck whereby they are supported in contracted aligned relation at the rear of the chuck, and a cutter head rotatably mounted on said chuck and provided with a plurality of external cutters acting externally on the ring elements successively while they are so supported and advanced.

3. A machine for machining split expansible resilient piston ring elements comprising an elongated chuck adapted to receive a plurality of split resilient expansible piston ring elements in side by side relation, said chuck having a rearwardly tapered portion at the rear end thereof whereby the ring elements are contracted as they are successively advanced therein and discharged from the rear end thereof, work aligning means disposed longitudinally within said chuck and adapted to engage the splits of the ring elements advanced therein, pressure feed means for advancing a plurality of piston ring elements within said chuck in side by side relation and projecting the same from the rear end thereof, means for applying an opposed pressure to a plurality of ring elements so advanced and projected from the chuck whereby they are supported in contracted aligned relation at the rear of the chuck, a cutter acting externally on the ring elements successively while they are so supported and advanced, and a cutter acting internally upon the ring elements successively while so supported and advanced, said internal cutter being positioned to act upon the ring elements while they are being acted upon by said external cutter.

4. A machine for machining split expansible resilient piston ring elements comprising an elongated chuck adapted to receive a plurality of split resilient expansible piston ring elements in side by side relation, said chuck having a rearwardly tapered portion at the rear end thereof whereby the ring elements are contracted as they are successively advanced therein and discharged from the rear end thereof, work aligning means disposed longitudinally within said chuck and adapted to engage the splits of the ring elements advanced therein, pressure feed means for advancing a plurality of piston ring elements within said chuck in side by side relation and projecting the same from the rear end thereof, means for applying an opposed pressure to a plurality of ring elements so advanced and projected from the chuck whereby they are supported in contracted aligned relation at the rear of the chuck, and a cutter acting on the ring elements successively while they are so supported and advanced.

5. In a machine of the class described, the combination of an elongated chuck adapted to receive work at its front end and discharge work at its rear end, said chuck having an internal longitudinal aligning spline adapted to enter the split of split piston rings or the like and having a rearwardly tapered work contracting and sizing portion, feed and clamping means adapted to advance a plurality of pieces of work through the chuck and supportingly clamp the same by endwise pressure as discharged from the chuck, a rotating cutter-head provided with a plurality of cutters acting on the work at the rear of the chuck and while it is supported in contracted position by said feed and clamping means, and an internal rotatable cutter extending into the work from the rear end thereof and acting upon the work elements while so supported.

6. In a machine of the class described, the combination of an elongated chuck adapted to receive work at its front end and discharge work at its rear end, said chuck having an internal longitudinal aligning spline adapted to enter the split of split piston rings or the like and having a rearwardly tapered work contracting and sizing portion, feed and clamping means adapted to advance a plurality of pieces of work through the chuck and supportingly clamp the same by endwise pressure as discharged from the chuck, and a rotating cutter-head provided with a plurality of cutters acting on the work at the rear of the chuck and while it is supported in contracted position by said feed and clamping means.

7. In a machine of the class described, the combination of a chuck adapted to receive a plurality of work elements at its front end and discharge the same at its rear end, said chuck being adapted to receive a plurality of split resilient work elements and to contract the same as they are advanced through the chuck, front and rear hydraulic rams adapted to advance the plurality of work elements through the chuck and supportingly clamp the same in alignment by endwise pressure as they are discharged from the chuck, an external cutter rotating around the work elements and adapted to successively act upon the work elements as they are advanced at the rear of the chuck and while supported by said front and rear rams, and an internal cutter disposed into the work elements to successively act thereon as they are successively advanced, said internal and external cuttes simultaneously acting upon the same work element.

8. In a machine of the class described, the combination of a chuck adapted to receive a plurality of work elements at its front end and discharge the same at its rear end, said chuck being adapted to receive a plurality of split resilient work elements and to contract the same as they are advanced through the chuck, front and rear hydraulic rams adapted to advance the plurality of work elements through the chuck and supportingly clamp the same in alignment by endwise pressure as they are discharged from the chuck, and an external cutter rotating around the work elements and adapted to successively act upon the work elements as they are advanced at the rear of the chuck and while supported by said front and rear rams.

9. In a machine of the class described, the combination of a chuck adapted to receive a plurality of work elements at its front end and discharge the same at its rear end, said chuck being adapted to receive a plurality of split resilient work elements and to contract the same as they are advanced through the chuck, front and rear hydraulic rams adapted to advance the plurality of work elements through the chuck and supportingly clamp the same in alignment by endwise pressure as they are discharged from the chuck, and a rotating tool disposed to successively act upon the work elements as they are advanced at the rear of the chuck and while supported by said front and rear rams.

10. In a machine of the class described, the combination of an elongated chuck adapted to receive work at its front end and discharge work at its rear end, said chuck having a work contracting and sizing portion adapted to contract and size split resilient annular elements, a feed means for advancing a plurality of work elements through the chuck in side by side relation, a pressure means opposed to said feed means and coacting therewith to supportingly clamp the work elements in side by side relation as discharged from the chuck, a tool acting externally and successively on the work elements at the rear of the chuck and while the work elements are supported in contracted position, and an internal tool extending into the work from the rear thereof and acting upon the work elements simultaneously with the action thereon by the external tool.

11. In a machine of the class described, the combination of an elongated chuck adapted to receive work at its front end and discharge work at its rear end, said chuck having a work contracting and sizing portion adapted to contract and size split resilient annular elements, a feed means for advancing a plurality of work elements through the chuck in side by side relation, a pressure means opposed to said feed means and coacting therewith to supportingly clamp the work elements in side by side relation as discharged from the chuck, and a tool acting externally and successively on the work elements at the rear of the chuck and while the work elements are supported in contracted position.

12. In a machine of the class described, the combination of an elongated chuck adapted to receive work at its front end and discharge work at its rear end, said chuck having a work contracting and sizing portion adapted to contract and size split resilient annular elements, a feed means for advancing a plurality of work elements through the chuck in side by side relation, a pressure means opposed to said feed means and coacting therewith to supportingly clamp the work elements in side by side relation as discharged from the chuck, and an internal tool extending into the work from the rear thereof and acting upon the work while so supported.

13. In a machine of the class described, the combination of an elongated chuck adapted to receive work at its front end and discharge work at its rear end, said chuck having a work contracting and sizing portion adapted to contract and size split resilient annular elements, a feed means for advancing a plurality of work elements through the chuck in side by side relation, a pressure means opposed to said feed means and coacting therewith to supportingly clamp the work elements in side by side relation as discharged from the chuck, and a tool acting successively on the work elements at the rear of the chuck and while the work elements are supported in contracted position.

HAROLD P. PHILLIPS.